United States Patent [19]

Wallingford

[11] Patent Number: 4,849,871
[45] Date of Patent: Jul. 18, 1989

[54] THREE-PHASE PWM INVERTER WITH SPEED CONTROL AND LOAD COMPENSATION FOR AN INDUCTION MOTOR

[76] Inventor: Errol E. Wallingford, 1022 Spa Rd. Apt. L., Annapolis, Md. 21403

[21] Appl. No.: 86,862

[22] Filed: Aug. 18, 1987

[30] Foreign Application Priority Data

Nov. 12, 1986 [CA] Canada .................. 522757

[51] Int. Cl.$^4$ .............................................. H02M 1/14
[52] U.S. Cl. ..................................... 363/41; 363/132; 318/811; 318/801
[58] Field of Search .................. 318/811; 363/41, 98, 363/132

[56] References Cited

U.S. PATENT DOCUMENTS

| | | | |
|---|---|---|---|
| 4,099,109 | 7/1978 | Abbondanti | 363/41 X |
| 4,337,429 | 6/1982 | Stuart | 363/41 X |
| 4,458,194 | 7/1984 | Geppert et al. | 363/41 X |
| 4,587,605 | 5/1986 | Kouyama et al. | 363/41 |
| 4,621,316 | 11/1986 | Uesugi | 363/41 X |
| 4,656,572 | 4/1987 | Caputo et al. | 363/41 |
| 4,686,480 | 8/1987 | Katto et al. | 363/41 X |

*Primary Examiner*—William M. Shoop, Jr.
*Assistant Examiner*—Marc S. Hoff
*Attorney, Agent, or Firm*—Bradford E. Kile

[57] ABSTRACT

According to the present invention, there is provided a harmonically suppressed driver for a three phase full bridge pulse width modulated (PWM) inverter, for driving an AC motor. The driver generates three phase PWM waveforms for operating a motor in a speed range of from approximately 240 to 4000 rpm. Below 1800 rpm, voltage reduction is implemented by phase shifting in order to maintain constant volt-sec operation and prevent armature flux saturation. Additional load dependent flux compensation is achieved by measuring motor speed, calculating the slip and providing compensation at large slips.

19 Claims, 4 Drawing Sheets

THREE-PHASE PWM INVERTER WITH SPEED CONTROL AND LOAD COMPENSATION FOR AN INDUCTION MOTOR

This invention relates in general to AC motors, and more particularly to a harmonically suppressed driver for a three phase full bridge pulse width modulated inverted.

Inverters are well know for use as AC motor drive circuits or drivers which transfer energy from a DC source into single or multi-phase voltage and frequency controlled sinusoidal drive currents. The inverters are typically comprised of power switches such as, for example, gated power thyristors, which are triggered in a predetermined sequence to generate the appropriate drive current waveforms for application to the AC motor coils. When the inverter generated waveforms are applied to the coils, the motor responds by producing positive and braking torques in a well known manner.

However, the nature of AC motor operation has resulted in a number of difficulties associated with driving the motor with an inverter. For example, it has been found that as the frequency of the motor is adjusted, the voltage must also be adjusted to keep a nominal voltage-to-frequency ratio, in order to preserve a constant peak flux density and an invariable condition of magnetic core saturation.

Furthermore, it has been discovered that the switching function of the thyristors distorts the current waveform in such a way as to add harmonics. These harmonics have the effect of generating voltage dips on the DC line, and imposing a strong harmonic content on the current flowing through the AC motor coils, which has been found to contribute to motor losses.

Compared with a pure sinusoidal driving current, the normal losses in a motor fed from an inverter are typically augmented by power losses arising from the harmonic currents and by increased skin effect in the windings, high frequency core losses, losses due to skew leakage flux (which may be large at harmonic frequencies), losses in the end windings, load (stray) losses arising from space-harmonic MMFs excited by the harmonic currents, etc.

In addition, it has been found that the harmonic currents generated by prior art PWM inverters typically develop forward and backward directed harmonic torques due to the interaction at various speeds of pairs of gap-flux and current components.

As a result of these problems, various pulse width modulation (PWM) techniques have been developed for use in forced commutation inverters feeding variable speed AC motor drive systems to limit the amplitude of the generated harmonics, and thereby reduce the harmful effects on the motor of such harmonics.

One technique for removing harmonics from pulse width modulated waveforms was suggested by B. Mokrytzki in an article entitled PULSE WIDTH MODULATED INVERTERS FOR AC MOTOR DRIVES, IEEE Trans. Inc. and Gen. Appl., volume IGA-3, No. 6, pp. 493-503, November/December 1967. According to this technique, triangular modulation was utilized to provide a predetermined number of switching points or "chops" in each cycle of the PWM waveform applied to the inverter power switches. An unspecified number of harmonics was indicated as having been removed using twenty four switch points per cycle in a full bridge inverter.

According to a theoretical paper by Patel and Hoft, entitled GENERALIZED TECHNIQUES OF HARMONIC ELIMINATION AND VOLTAGE CONTROL IN THYRISTOR INVERTERS: Part I - Harmonic Elimination, IEEE Transactions on Industry Applications, Vol. IA-9, No. 3, May/June 1973, pages 310-317, five specific harmonics were indicated as having been eliminated by utilizing only twenty switch points per cycle. Patel and Hoft applied numerical techniques to solve for the switching points required in a single cycle of the pulse width modulated waveform in order to eliminate specific harmonics. They showed that it is possible to eliminate as many harmonics as there are pulses per half cycle when using a full bridge inverter, by constraining the width and position of the pulses within the half cycle.

In their paper, Patel and Hoft presented a series of equations using Fourier mathematics, for correlating the amplitudes of specific harmonics with the number of harmonics to be eliminated and the specific switching points in a single cycle of the PWM waveform. Thus, by setting each harmonic amplitude to zero, and solving the equation for a predetermined number of switching points corresponding to a number of harmonics to be eliminated, the values of the specific switching points (in degrees) could be calculated.

These same authors next extended their study to motor speed control with voltage reduction, as reported in their article entitled GENERALIZED TECHNIQUES OF HARMONIC ELIMINATION AND VOLTAGE CONTROL IN THYRISTOR INVERTERS: Part II - Voltage Control Techniques, IEEE Transactions on Industry Applications, Vol. 1A-10, No. 5, September/October 1974. They showed that a full bridge has a very distinct advantage over half bridge inverters under voltage control conditions, since all of the harmonic elimination switching points remain unchanged with reduced voltage. By way of contrast, the switching points required for harmonic elimination utilizing half bridge inverters were found to be very dependent on the generated voltage. In particular, they discovered that the half bridge inverter waveform requires two more commutations per cycle than the full bridge inverter in order to eliminate a predetermined number of harmonics. Patel and Hoft concluded from this that optimum harmonic elimination at all speeds could be accomplished utilizing a simple phase shift for voltage reduction in a full bridge inverter.

Most of the research efforts subsequent to the articles of Patel and Hoft have concentrated on half bridge inverters since they require fewer parts than full bridge inverters (i.e., typically only six instead of twelve thyristors). However, much of the research has tended to ignore the non-linear harmonic reduction problems discussed above during voltage control conditions, resulting in systems which suffer from motor overheating and throbbing at reduced speeds due to harmonics.

Buja and Indri recognized this problem in their article entitled OPTIMAL PULSE WIDTH MODULATION FOR FEEDING AC MOTORS, IEEE Transactions on Industry Applications, Vol. 1A-13, No. 1, January/February 1977, and suggested a suboptimal harmonic reduction technique for minimizing a pair of harmonics under voltage control conditions. Time consuming graphical techniques were suggested for determining the changing switching points for harmonic elimination.

More recently Zuckerberger and Alexandrovitz presented an analytic technique for suboptimally calculating the switching points for a half bridge inverter, resulting in voltage control at low speeds by shifting the energy of the fundamental primarily to the ninth harmonic. This technique is disclosed in an article by Zuckerberger and Alexandrovitz entitled DETERMINATION OF COMMUTATION SEQUENCE WITH A VIEW TO ELIMINATING HARMONICS IN MICROPROCESSOR CONTROLLED PWM VOLTAGE INVERTER, IEEE Trans. Ind. Elect. Vol. IE-33, No. 3, August 1986.

A three phase implementation of the Zuckerberger and Alexandrovitz technique was found to cancel the fundamental frequency energy as a result of symmetry. The implementation of this scheme utilized an RL load to simulate a motor and conventional microcomputer implementation, resulting in a maximum simulated motor speed of only 1140 rpm (or 38 Hz).

None of the aforementioned prior art techniques have addressed the problem of voltage or flux control under varying load conditions. In an article entitled METHOD OF FLUX CONTROL IN INDUCTION MOTORS DRIVEN BY VARIABLE FREQUENCY, VARIABLE VOLTAGE DRIVES, IEEE/IAS International Semiconductor Power Conv. Conf. pages 177–184, 1977, Abbondanti presented a theory and novel implementation for automatic compensation under varying speeds, for load or regenerative conditions up to 200% of rated values.

Another problem not addressed in the prior art, is the difficulty of transition between constant torque operation where voltage reduction is required, and constant horsepower operation where voltage reduction is not required.

In addition, the conventional microprocessor implementation of prior art pulse width modulated inverters typically cannot handle high speeds and maintain switching points accurately positioned within one degree of rotation at such high speeds.

According to the present invention, a dual microprocessor harmonically suppressed driver is provided for a three phase full bridge PWM inverter. The implementation comprises a master microprocessor and a slave microprocessor. The master microprocessor operates with a low duty cycle, accepts input speed change requests from an operator or user, and generates digital address signals to the slave microprocessor in response thereto, for control of speed and flux compensation. The slave microprocessor generates the actual three phase PWM waveforms synchronously with a 100% duty cycle, and applies the generated PWM waveforms to control inputs of the inverter power switches, for inducing drive currents in the AC motor coils.

The slave microprocessor executes a program loop for accessing successive phases or degrees of the PWM waveforms. The loop is characterized by a predetermined number of clock cycles which is related to the speed of rotation of the motor. Thus, by varying the number of clock cycles required for execution of the program loop (i.e., by varying the number of instructions in the loop), the frequency of the PWM waveform can be increased or decreased, thereby controlling the speed of rotation of the motor.

The system of the present invention must be implemented utilizing a slave microprocessor which has a fixed and known number of clock cycles per instruction since the number of clock cycles is intimately related to speed and flux compensation control of the AC motor.

An important advantage of the present invention over the prior art is that by utilizing a low level clock cycle language, synchronous applications are possible due to the very accurate control of timing.

According to a preferred embodiment, an implementation of Patel and Hoft's optimum full bridge inverter model is provided, with phase shift control for automatic elimination of five harmonics by storing a PWM waveform as a series of digital values in a computer member based look-up table. Preferably at least 360 values are stored having twenty fixed switching points per cycle, wherein each value corresponds to one degree of rotation in one revolution of the motor. Thus, by accessing successive entries in the table, and sequencing the inverter power switches in accordance therewith, a harmonically suppressed drive current is developed in each coil of the motor. All repetitive operations such as switching of the PWM waveform at any degree, and restarting access at the beginning of the table, are implemented so as to use an exact number of clock cycles. To this end, dummy instructions (such as NOP's) are used to maintain synchronicity.

Both constant horsepower and constant torque operation are provided by the system of the present invention. Complete interdependence between speed of operation and voltage applied to the motor coils is accomplished using delays and phase shifting of the PWM waveform.

In addition, a software implementation of Abbondanti's load or regenerative flux compensation technique is provided using simple phase shifting. The load compensation technique requires measurement of the actual load or speed via, for example, a simple Hall field effect speed sensor attached externally to the motor. The master microprocessor can perform a calculation based on Abbondanti's flux compensation curve, and provide the necessary phase shift control information to the slave microprocessor which in response generates the phase shifted PWM waveform.

According to a successful prototype, the dual microprocessor driver successfully controlled a 208 volt, three phase, one quarter horsepower wound rotor induction motor powered through 12 Hexfet power switches from a DC power supply. The use of clock cycle language resulted in speeds of up to 4000 rpm (or 133 Hz), which is approximately four times faster than the simulation suggested in the article of Zuckerberger and Alexandrowitz. For speeds less than 1800 rpm, voltage control was performed via phase shifting of the PWM waveform, as discussed above.

Test results of the prototype under varying load conditions were displayed on a video terminal, and a potentiometer and analog-to-digital converter were utilized to provide user input to the master microprocessor for changing speeds.

A better understanding of the present invention will be obtained with reference to detailed description below in conjunction with the following drawings, in which:

FIGS. 2(*a*), 2(*b*) and 2(*c*) are simplified waveform diagrams of three phases of control voltage applied to the inverter of FIG. 1.

Figure 1:
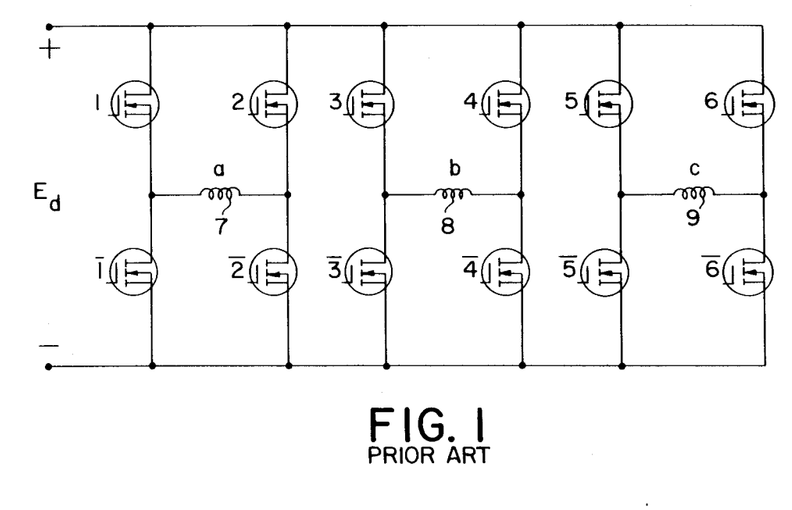
FIG. 1 is a schematic diagram of a well known full bridge inverter.

With reference to FIG. 1, a full bridge inverter is illustrated comprised of 12 Hexfet power switches (such as IGFET enhancement mode N-channel switches) arranged in complement pairs denoted as 1, $\overline{1}$ and 2, $\overline{2}$...6, $\overline{6}$. The switches are connected across three coils 7, 8 and 9 of a three phase motor. The six pairs of power switches are enabled by twelve floating power Hexfet drivers which in turn are driven by six TTL control signals through opto-isolators, as discussed in greater detail below with reference to FIG. 4.

Figure 2A:
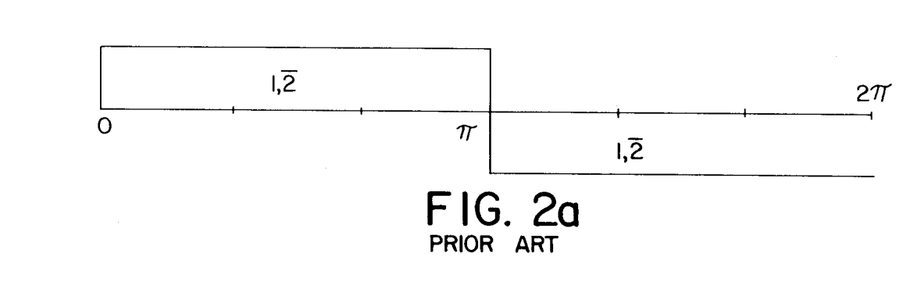
Figure 2B:
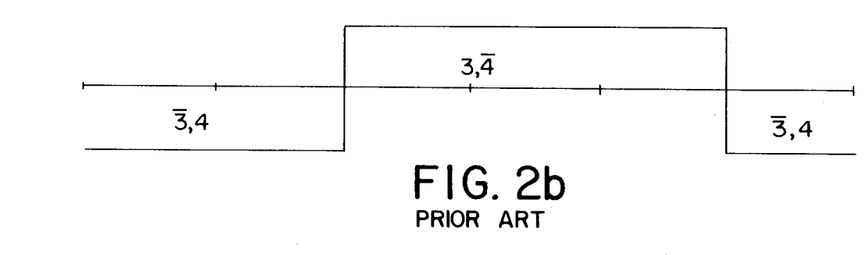
Figure 2C:
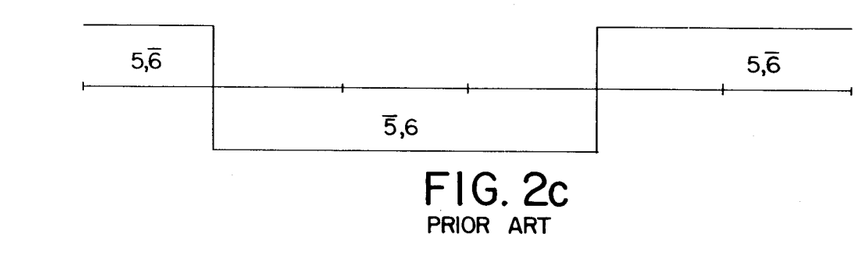

With references to FIGS. 2(a), 2(b) and 2(c), a simplified switching pattern is illustrated for driving the a, b and c coils (7-9) of the AC motor.

Each of the pairs of complementary power switches 1, $\overline{1}$ and 2, $\overline{2}$...6, $\overline{6}$ are enabled according to the general sequence of control signals illustrated, so as to connect the respective ends of the coils 7-9 to the positive and negative lines of a source of DC voltage, denoted as $E_d$, in FIG. 1. In response, 120° phase shifted sinusoidal drive currents are generated in respective ones of the coils, for driving the motor.

However, as discussed above, the switching characteristics of the inverter are such that the current flowing in the three-phase coils 7-9 of the motor typically suffer from distortion in the form of excess harmonic content. Thus, it is preferred that in actual fact a pulse width modulated waveform (such as derived by Patel and Hoft) be applied to the power switches in order to control current flow in the AC motor coils in such a manner as to suppress the harmonics.

Figure 3:
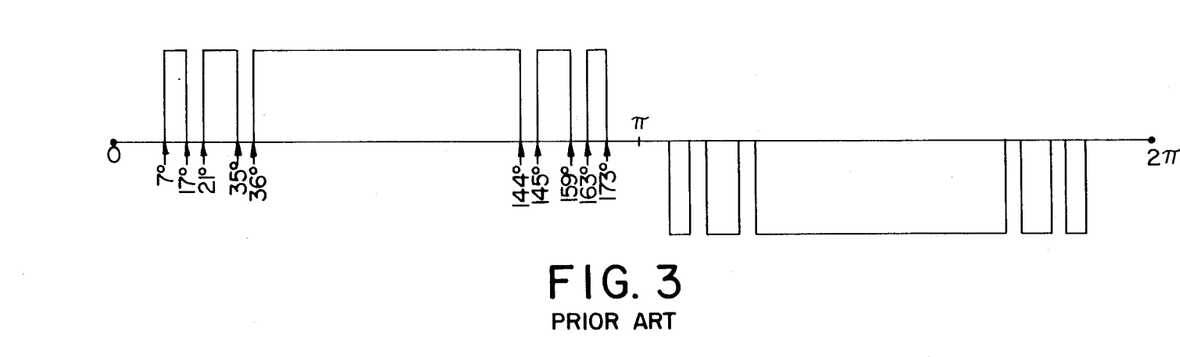
FIG. 3 is a waveform diagram of a single phase of a pulse width modulated control voltage applied to the inverter of FIG. 1, for generating a harmonically suppressed drive current.

In particular, the waveform illustrated in FIG. 3 corresponds to an approximation of a solution waveform derived utilizing the Patel and Hoft method for eliminating fifth, seventh, eleventh, thirteenth and seventeenth harmonics.

Patel and Hoft measured the harmonic content of a current drive waveform generated by an inverter triggered using the PWM waveform of FIG. 3, as follows:

| Order of harmonic | Absolute value of the harmonic coefficients | Absolute value of harmonic as % of the fundamental |
| --- | --- | --- |
| 1 (fundamental) | 1.1701 | 100.00 |
| 3 | 0.1764 | 15.08 |
| 5 | 0.0157 | 1.34 |
| 7 | 0.0306 | 2.62 |
| 9 | 0.0115 | 0.98 |
| 11 | 0.0021 | 0.18 |
| 13 | 0.0133 | 1.14 |
| 15 | 0.0294 | 2.51 |
| 17 | 0.0073 | 0.63 |
| 19 | 0.1303 | 11.14 |
| 21 | 0.2840 | 24.27 |

Figure 4:
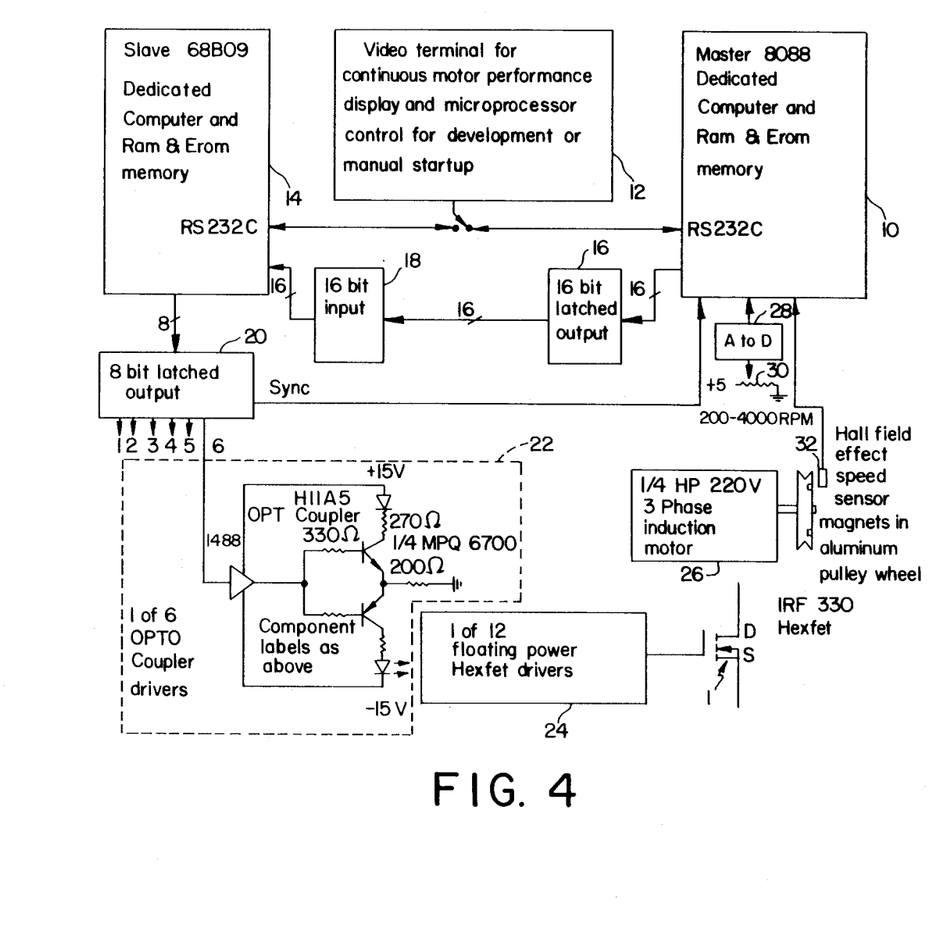
FIG. 4 is a block schematic diagram of a harmonically suppressed driver for use with an AC motor, according to the present invention.

Turning now to FIG. 4, the harmonically suppressed driver according to the present invention is illustrated. A master microprocessor 10 is connected to a video terminal 12 via an RS232 port, and to a slave microprocessor 14 via a pair of 16 bit parallel latches 16 and 18.

An 8-bit output signal of the slave microprocessor 14 is applied to an 8-bit latch 20, and therefrom to six optocoupler drivers, such as the optocoupler driver 22, and to the master microprocessor 10 for ensuring proper timing of address data transfer from the master microprocessor to the slave microprocessor.

Two optical signals from each of the six optocoupler drivers, such as driver 22, are applied to respective ones of twelve floating power Hexfet drivers (such as driver 24) for providing gate voltages between −5 and 10 volts for the power Hexfets, dependent on input signal level. The Hexfet drivers, such as driver 24, use transistors to convert the opto-coupler signals to the high input impedance low gate drive voltage required for operating the power switches, such as power switch 1, as discussed above with reference to FIG. 1.

The reader is referred to manufacturer's recommendations in well known Hexfet manuals (or transistor manuals if transistor switching is used), in order to determine correct drive requirements.

According to a successful prototype, the coils 7-9 discussed above in relation to FIG. 1, formed part of a one-quarter horsepower 220 volt three phase induction motor 26.

An A to D converter 28 is connected to a potentiometer 30 for controlling the speed of rotation of the motor 26 via master microprocessor 10.

A Hall field effect speed sensor 32 is positioned relative to a pair of magnets displaced by 180° on an aluminum pully wheel connected to the AC motor 26, and the output of the speed sensor 32 is connected to master microprocessor 10, for controlling load flux compensation.

As discussed above with reference to FIGS. 1 and 2, a three phase motor is required to be driven by three separate pulse width modulated signals, each offset by 120°. Accordingly, the slave microprocessor 14 performs a memory table look-up of six PWM waveforms as shown in FIG. 3, three of the PWM waveforms being 120° phase displaced, and the remaining three waveforms being complement or inverted versions of the first three waveforms.

The six waveforms are stored as 360 8-bit digital signals representing entries of a look-up table, each entry corresponding to one degree of rotation of the motor. Each byte in the look-up table conforms to the following format: d, 1, 3, 5, d, 2, 4, 6, where "d" denotes a "don't care" condition and the other six numbers signify the power switch pairs to which the corresponding bit from the table is applied. Only six bits are required since the complementary bits are generated by the aforementioned floating power Hexfet drivers, such as driver 24.

In operation, the 360 bytes of switching information residing in the local look-up table, are sequentially accessed and synchronously presented to the inverter of FIG. 1, repeatedly in a closed loop, thereby generating three phase harmonic suppressed sinusoidal drive currents in the AC motor coils 7-9.

As discussed in greater detail below, harmonically suppressed voltage waveforms can be generated in the range of from 133 hertz down to 60 hertz by simply introducing a delay factor to the table look-up routine, conforming to a predetermined number of microprocessor clock cycles.

Because the waveform generation is performed in software, the synchronous rpm speed of the motor can be expressed as follows:

$$n_{sync} = 120 f/p = (30 f) \text{ rev/min},$$
$$= 30/T \text{ rev/min},$$

where
T equals time in seconds per revolution,
f equals frequency in hertz, and
p equals number of poles.

According to the successful prototype, slave microprocessor 14 was a Motorola model 6809 driven by a 6.1440 MHz crystal which, when divided by four, gives a 1.536 MHz clock or 651 ns cycle time. Therefore, a predetermined number of clock cycles of computer instructions are required for each degree of rotation of the motor. Thus, for 360° of rotation:

$$T = 360 * X * 651 \times 10^{-9} \text{ sec.},$$

or $$n_{sync} = \frac{30,000,000}{.360 * X * 651} = \frac{128,000}{X \text{ clock cycles}}$$

Therefore, for a maximum speed of 4000 rpm, a maximum programming instruction set of $X = 128,000/4,000 = 32$ clock cycles is required to access each successive entry of the lock-up table. Thus, during 32 clock cycles, one byte must be fetched from the look-up table, written to the inverter, and the look-up table pointer must be advanced, or reset if the last value of the look-up table has been accessed.

For synchronous operation, each write operation to the inverter must occur exactly within 32 clock cycles (29.8 microseconds), even when the table is reset, in order to maintain 4000 rpm motor rotation.

An assembler like program listing which accommodated fifteen actual motor speeds, is shown in table 1, with reference to Appendix A.

The speed of rotation of the motor is calculated as discussed above by counting the number of computer clock cycles. It should be noted that three dummy instructions are utilized to balance the number of clock cycles irrespective of whether the inverter switching is occurring due to normal sequential access through the table or as a result of the table pointer being reset to the beginning of the table.

The first instruction of the code in table 1 loads the starting address (E0B4 hex) of the 360 byte look-up table, typically stored in EROM. The second instruction loads the actual memory address of the speed required. This memory address is provided by microprocessor 10 through the latched port 16 shown in FIG. 4. The slave microprocessor 14 picks up the current value via the 16-bit input port 18 of FIG. 4, which is arbitrarily placed at hex address 3000. For example, for 4000 rpm, the X register would be loaded with the value E22C hex.

The third instruction jumps to the address identified by the X register. For 4000 rpm operation, no additional delay is provided in the program loop, i.e., a minimum of 32 clock cycles are executed per table access. Accordingly, the instruction at the address E22C hex is executed, such that the A register is loaded with the byte residing at the start of the look-up table, (i.e. at address E0B4). Next, the accessed byte is written to the power switch pairs of the inverter as a six bit digital signal, via the 8 bit latch 20, optocoupler drivers (such as driver 22) and the Hexfet drivers (such as driver 24).

Next, at address E231, a comparison is performed to determine whether the microprocessor has accessed the last entry in the table, and if not three dummy instructions are executed at addresses E237-E239 hex, the pointer is incremented, and program control branches back to address E227 hex for accessing the next byte in the look-up table.

A full cycle of 360° bytes of the PWM waveform are sequentially accessed before starting a new cycle.

Once the comparison at address E235 hex indicates that the last entry in the look-up table has been accessed, program control branches to address E220 hex for reloading the starting address of the look-up table and reloading a new jump address for defining the motor speed, if such a new address has been presented to the slave microprocessor 14 from the master microprocessor 10.

Thus, when a new cycle has started, and a new speed change command has been received from the master microprocessor 10, the next cycle of PWM waveform generation occurs at the new speed.

It is apparent from analyzing the assembler code of table 1 that additional delays can be introduced to the execution time of the program by causing the jump instruction at address E227 hex to branch execution of the program to one of the sequential or chained branch instructions at addresses E23D-E251 hex.

As discussed above, for driving the AC motor at speeds below 1800 rpm, phase shifting of the PWM waveform applied to the pairs of power switches connected across individual ones of the motor coils is required, in order to maintain constant volt - sec operation, and thereby prevent core saturation. Patel and Hoft derived a solution for a full bridge inverter utilizing the same harmonically suppressed waveform switching values as shown in FIG. 3, while reducing the voltage by using a simple phase shift, as follows:

$$f/f_{max} = \sin\phi/2$$

where $\phi$ equals the phase shift in degrees between PWM waveforms applied to power switches connected to opposite terminals of each of the coils 7-9, (i.e., the phase shift between the PWM waveforms applied to switches 1 and 2, 3 and 4, 5 and 6). When $\phi$ equals $\pi$, there is no phase shift; resulting in 60 hertz or 1800 rpm motor rotation. By decreasing $\phi$, both the frequency and the voltage decrease until when $\phi$ equals zero, they are both zero.

To implement the phase shift voltage reduction, the original 360 entry switching table located at addresses E0B4 to E21C hex is preceded by 180 entries starting at address E000 hex comprising one half cycle of the PWM waveform.

Referring to FIG. 1, and recalling the byte switching format of d, 1, 3, 5, d, 2, 4, 6, power switch pairs 1, $\overline{1}$, 3, $\overline{3}$, and 5, $\overline{5}$ are driven by the PWM waveform stored at E0B4 to E21C, while the power switch pairs 2, $\overline{2}$, 4, $\overline{4}$, and 6, $\overline{6}$ are driven by the phase shifted PWM waveform stored at locations E000 to E168, wherein the phase shift value of $\phi$ is calculated according to the formula discussed above.

Also, a delay subprogram is provided as shown in table 2 of Appendix B, for varying the look-up table access time by a predetermined number of clock cycles, thereby to control the frequency of rotation of the motor.

The first three lines of the low speed assembly code program in table 2 are identical to the first three instructions of the program listing as shown in table 1. Namely, the look-up table address pointer is loaded with the start address (i.e., EOB4 hex) of the 360 value PWM waveform table. A jump value is then loaded into the X register for defining the speed of rotation (for example 518 rpm), and program control branches to the address stored in the X register, (i.e. E2D8 hex).

The delay required is not a linear function of speed reduction for all speeds, which means that increasingly larger delays are required at lower speeds to maintain equal speed reduction steps.

In response to executing the instruction located at address E2D8 hex, the X register is loaded with a phase shift address value (eg. E021 hex which conforms to a phase shift of $\phi$ equals 33° within the extended look-up table). Next, the B register is loaded with a delay value of 24 hex (corresponding to 36 program loop repetitions), and program control then branches to the flux compensation subroutine "flxcomp", located at address E256 hex.

According to the flux compensation subroutine, the delay value is stored in the A register, the A register is decremented, and a comparison is performed to determine whether the value stored in the A register is equal to zero. If not, the loop is repeated until such time as the value of the A register has been decremented to zero. Thus, for 518 rpm operation, the subprogram "1p" is repeated 36 times, requiring 75 clock cycles.

Next, the A register is loaded with the 8-bit digital signal representing the first entry of the 360° look-up table, the low nibble stored in the A register is then cleared, and the contents of the A register are stored in a temporary register, "temp".

Then, the A register is loaded with the phase shifted address value defined by $\phi$, for accessing the appropriate phase shifted byte from the extended or augmented table. Thus, for 518 rpm, the byte located at E021 hex is loaded into A. The high nibble of the value stored in the A register is then cleared, and the contents of the A register are added to the contents of the "temp" register, forming a digital signal which is then written to the appropriate power switches of the inverter in FIG. 1.

The byte wide digital signals are written to the switches via 8 bit latch 20, the optocoupler drivers such as 22, and the floating power Hexfet drivers such as 24, as discussed above. A comparison is performed to determine whether the end of the look-up table has been reached, (i.e., E2C hex), and if so, a new cycle is performed. Otherwise three dummy instructions are executed, starting at address E272 hex, the look-up table pointer is incremented and the "flxcomp" subprogram is repeated until one full cycle of PWM waveform generation has been completed. As discussed above, the dummy instructions are required to maintain synchronism.

Flux compensation is not required above a motor's normal 60Hz synchronous speed. Below this speed flux compensation with respect to load can be implemented at any particular synchronous speed by maintaining the same delay as defined by the subprograms of table 2 (low speed), by changing the shift values positively or negatively, as shown in table 3 of Appendix C, which is representative of the load dependent flux compensation alternatives for the 518 rpm operation speed. The flux compensation values stored in table 3 are preferably selected from the speedload curves described in the article of Abbondanti, discussed above. Additional flux compensation values are stored relating to each of the possible speeds of motor rotation.

As discussed above, the only data transferred from the master processor 10 to the slave microprocessor 14 is the 16-bit memory address for identifying the desired speed of rotation and flux compensation. The 16-bit address is used by the slave microprocessor 14 to branch program control to the correct synchronous rpm, voltage reduction and load compensation subprograms, as discussed above with reference to tables 1–3.

Only valid jump addresses may be presented to the slave microprocessor 14 since invalid addresses would halt waveform generation. This is accomplished in the master microprocessor 10 by utilizing only valid addresses stored in a further look-up table therein. Also, to avoid changes in speed during a slave microprocessor read operation at the start of each new cycle, the master microprocessor 10 waits for a pulse signal from the slave microprocessor 14 prior to latching the 16-bit address. The pulse signal is identified by the symbol SYNC in FIG. 4, and is formed from one of the two don't care "d" bits, and latched via one of the two remaining bits of the 8-bit latch 20.

An operator or user may adjust the desired motor synchronous speed by varying a ptentiometer 30 across a +5 volt source. The voltage magnitude is converted to digital values using an inexpensive analog-to-digital converter 28, and the aforementioned table look-up in the master microprocessor 10 accesses the closest available synchronous rpm to the potentiometer setting. Using an 8-bit analog-to-digital converter 28, 256 different speeds may be accommodated. Most of these speeds are typically quite low since the thirty two clock cycle subprogram of table 1, for causing 4000 rpm rotation, is the minimum programmable delay for a 6809 microprocessor.

According to the successful prototype, thirty different speeds between 4000 and 1800 rpm were implemented. A utility hexadecimal-to-decimal conversion routine was executed by master microprocessor 10 to provide the user with a visual readout of his or her chosen speed via a video terminal 12. The visual readout was updated approximately every few seconds.

In order to perform the above mentioned flux compensation with loading, the actual motor speed was measured using the aforementioned Hall field effect sensor 32 and small circular magnets mounted in an aluminum disk placed on the rotating motor shaft. The ratio of off to on time was counted in computer loop cycles via master microprocessor 10 independently of motor speed. The measurement of slip was performed by simply subtracting the actual rpm from the synchronous rpm and dividing by the synchronous rpm, in a well known manner.

Absolute calibration was thus easily performed by measuring the computer loop cycles for a complete revolution of the synchronous speed using the midcycle synchronizing pulse (sync) described earlier. A default timeout was utilized to permit the master microprocessor 10 to continue processing at very low motor rpms. In this case, an rpm of zero was displayed at the video terminal 12.

The motor used in the successful prototype was a four pole, wound rotor, 220 volt, 60 hertz, one-quarter horsepower induction motor, which was used primarily for teaching motor fundamentals rather than for its efficiency since full load speed was rated at 1500 rpm for a very high slip of 16.7%.

As discussed above, normal voltage per frequency voltage reduction below 1800 rpm was chosen as a default condition. However, whenever the slip exceeded 16.7%, then one, or if necessary two steps of positive voltage compensation were used, as discussed with reference to table 3. In the event that the slip turned negative, such as during rapid deceleration, then one or two steps of negative voltage compensation were used. For the successful prototype, implementation labels as well as the values of motor sync rpm, motor actual rpm, percentage slip and percentage slip compensation were displayed continuously via video terminal 12 to provide the user with a continuous current record of motor performance.

According to the prototype, only thirty different motor speeds and four levels of compensation at each speed below 1800 rpm were implemented, since the prototype was designed only to provide feasibility. In practice, of course, many more speeds and levels of compensation may be provided.

The prototyp motor ran cool at all speeds, as expected from utilizing Patel and Hoft's harmonicly suppressed PWM waveforms, and the discussed voltage reduction techniques.

In summary, a softward implementation of a PWM waveform generator complete with flux and load compensation was easily implemented using a pair of inexpensive microprocessors. To implement several different speeds and several different compensations, several EROM entries were employed. Since most of the entries were the same, a computer program could easily be written to generate the entries. At speeds higher than 4000 rpm, a very fine speed resolution would be required. Thus, a faster slave microprocessor 14 could also be utilized.

A particularly attractive feature of the implementation according to the present invention, is the very simple control of flux compensation due to external loading. Since the master microprocessor 10 knows inherently the synchronous rpm, it need only measure the true rpm to implement flux compensation.

A person understanding the present invention may conceive of other embodiments or variations therein. All such embodiments or variations are considered to be within the sphere and scope of the present invention as defined in the claims appended thereto.

TABLE 1

Assembler code to generate 3-phase waveforms between 1803 & 4000 rpm
APPENDIX A

| RPM | MADDR | ASM CODE | LABEL | ASM LISTING | COMMENTS | TIMING LOOPS (clock cycles) | |
|---|---|---|---|---|---|---|---|
| | E220 | 108EE0B4 | newcycle | ldy #cyclestart | cycstr=EOB4 | 4 | |
| | E224 | BE3000 | | ldx speed | address from speed port 3000 | 6 | |
| | E227 | 6E84 | nxtdeg | jmp x | | 3 | 3 |
| 3368 | E229 | 12 | dly6 | nop | 38 cycles | | |
| 3556 | E22A | 12 | dly4 | nop | 36 cycles | | |
| 3765 | E22B | 12 | dly2 | nop | 34 cycles | | |
| 4000 | E22C | A6AO | | lda y+ | 32 cycles | 6 | 6 |
| | E22E | B73000 | setswitches | sta sw | sw=3000 | 5 | 5 |
| | E231 | 108CE21C | | cmpy cyclend | | 5 | 5 |
| | E235 | 27E9 | | beq newcycle | | 3 | 3 |
| | E237 | 12 | | nop | dummy | 2 | |
| | E238 | 12 | | nop | dummy | 2 | |
| | E239 | 1AOO | | orcc O | dummy | 3 | |
| | E23B | 2OEA | | b nxtdeg | | 3 | |
| 3122 | E23D | 20EA | dly9 | b dly6 | 41 cycles | 32 | 32 |
| 2909 | E23F | 20FC | dly12 | b dly9 | 44 cycles | | |
| 2723 | E241 | 20FC | dly15 | B dly12 | 47 cycles | | |
| 2560 | E243 | 20FC | dly18 | b dly15 | 50 cycles | | |
| 2415 | E245 | 20FC | dly21 | b dly18 | 53 cycles | | |
| 2286 | E247 | 20FC | dly24 | B dly21 | 56 cycles | | |
| 2169 | E249 | 20FC | dly27 | b dly24 | 59 cycles | | |
| 2065 | E24B | 20FC | dly30 | b dly27 | 62 cycles | | |
| 1969 | E24D | 20FC | dly33 | b dly30 | 65 cycles | | |
| 1882 | E24F | 20FC | dly36 | b dly33 | 68 cycles | | |
| 1803 | E251 | 20FC | dly39 | b dly36 | 71 cycles | | |

TABLE 2

Simple v/f flux compensation below sync. speed using f/f$_{max}$=sin0/2
APPENDIX B

| RPM | MADDR | ASM CODE | LABEL | ASM LISTING | COMMENTS | TIMING (cycles) | VOLTS |
|---|---|---|---|---|---|---|---|
| | E220 | 108EEOB4 | newcycle | ldy #cyclestart | cystr=EOB4 | 4 | |
| | E224 | BE3000 | | ldx speed | address from speed port 3000 | 6 | |
| | E227 | 6E84 | nxtdeg | jmp x | | 3 | |
| 518 | E2D8 | 8EEO21 | | ldx shiftbase | 0=33° | 3 | .284max |
| | E2DB | C624 | | ldb #dly | delay=36 | 2 | |
| | E2DD | 7EE256 | | jmp flxcomp | | 4 | |
| | E256 | 1F98 | flxcomp | tfr b,a | | 6 | |
| | E258 | 4A | lp | dec a | spdly*5 36* | (2 | |
| | E259 | 26FD | | bne lp | | (3 | |
| | E25B | A6AO | | lda y+ | unshifted value | 6 | |
| | E25D | 84FO | | anda FO | | 2 | |
| | E25F | B70350 | | sta temp | temp=0350 | 5 | |

TABLE 2-continued

Simple v/f flux compensation below sync. speed using $f/f_{max}=\sin\theta/2$
APPENDIX B

| RPM | MADDR | ASM CODE | LABEL | ASM LISTING | COMMENTS | TIMING (cycles) | VOLTS |
|---|---|---|---|---|---|---|---|
| | E262 | A680 | | lda x+ | shifted value | 6 | |
| | E264 | 84OF | | anda OF | | 2 | |
| | E266 | BB035O | | adda temp | | 5 | |
| | E269 | B73000 | | sta sw | to inverter | 5 | |
| | E26C | 108CE21C | | cmpy cyclend | | 5 | |
| | E27O | 27AE | | beq newcycle | | 3 | |
| | E272 | 11BCOOOO | | cmps O | dummy | 8 | |
| | E276 | 11BCOOOO | | cmps O | dummy | 8 | |
| | E27A | 12 | | nop | dummy | 2 | |
| | E27B | 7EE256 | | jmp flxcomp | cont. cycle | 4 | |
| | | | | | | 247 | |

TABLE 3

Normal + four slip compensating flux values for motoring or generating
APPENDIX C

| RPM | MADDR | ASM CODE | LABEL | ASM LISTING | COMMENTS | COMP | VOLTS |
|---|---|---|---|---|---|---|---|
| 518 | E2C8 | 8EEO34 | rpm518comp++ | ldx shiftbase | $\phi=52°$ | +54% | .438max |
| | E2CB | C624 | | ldb #dly | delay=36 | | |
| | E2CD | 7EE256 | | jmp flxcomp | | | |
| 518 | E2D0 | 8EE02B | rpm518comp+ | ldx shiftbase | $\phi=43°$ | +29% | .367max |
| | E2D3 | C624 | | ldb #dly | delay=36 | | |
| | E2D5 | 7EE256 | | jmp flxcomp | | | |
| 518 | E2D8 | 8EE021 | rpm518 | ldx shiftbase | $\phi=33°$ | 0% | .284max |
| | E2DB | C624 | | ldb #dly | delay=36 | | |
| | E2DD | 7EE256 | | jmp flxcomp | | | |
| 518 | E2E0 | 8EE01B | rpm518comp− | ldx shiftbase | $\phi=27°$ | −18% | .233max |
| | E2E3 | C624 | | ldb #dly | delay=36 | | |
| | E2E5 | 7EE256 | | jmp flxcomp | | | |
| 518 | E2E8 | 8EE016 | rpm518comp−− | ldx shiftbase | $\phi=22°$ | −33% | .190max |
| | E2EB | C624 | | ldb #dly | delay=36 | | |
| | E2ED | 7EE256 | | jmp flxcomp | | | |

The embodiments of the invention in which an exclusive property or privilege is claimed are defined as follows:

1. A harmonically suppressed driver for use with an AC motor comprising:
   (a) means for storing at least one cycle of a pulse width modulated wave form in the form of successive digital signals; and
   (b) means for sequentially accessing successive ones of said digital signals at a pre-determined rate;
   (c) inverter means for receiving said sequentially accessed signals and controlling current flow through one or more coils of said AC motor in response thereto producing a current flow through said one or more coils in the form of a harmonically suppressed sine wave;
   (d) wherein said means for sequentially accessing said successive digital signals is comprised of a slave microprocessor repeatedly executing a program loop for accessing said digital signals and applying said accessed signals to said inverter means, said program loop being characterized by a pre-determined number of slave microprocessor internal clock cycles which define the synchronous speed of rotation of said AC motor.

2. A driver as defined in claim 1, wherein said inverter means is comprised of a three-phase full bridge inverter for connection to three respective coils of said AC motor.

3. A driver as defined in claim 1, wherein said inverter means is comprised of a plurality of hexfet power switches for controlling current flow through one or more respective coils of said AC motor.

4. A driver as defined in claim 1, further including one or more opto-couplers for receiving said accessed digital signals and transmitting said signals to said inverter means in response thereto, for controlling operation of one or more power switches of said inverter means.

5. A driver as defined in claim 1, wherein:
   (a) said inverter means is comprised of a three phase full-bridge inverter circuit for connection to respective coils of said AC motor,
   (b) said means for storing is comprised of a computer memory based look-up table for storing at least 360,6-bit digital signals arranged in three pairs, each pair corresponding to successive degrees of one cycle of said waveform and one cycle of a complement of said waveform, and being 120° phase shifted from each other one of said pairs, and
   (c) said pulse width modulated waveform is comprised of a twenty switch point Patel and Hoft waveform for eliminating five harmonics of said harmonically suppressed sine wave.

6. A pulse width modulation driver for use with an AC motor comprising:
   (a) means for storing at least one cycle of a pulse width modulated wave form, in the form of successive digital signals;
   (b) means for sequentially accessing successive ones of said digital signals at a pre-determined rate; and
   (c) inverter means for receiving said sequentially accessed signals and controlling current flow through one or more coils of said AC motor in response thereto;
   (d) wherein said means for sequentially accessing said successive digital signals is comprised of a slave microprocessor repeatedly executing a program loop for accessing said digital signals and applying said accessed signals to said inverter means, said program loop being characterized by a pre-determined number of slave microprocessor internal clock cycles for each access which defines the synchronous speed of rotation of said AC motor and wherein said program loop includes a pre-determined number of successively arranged branch instructions defining said pre-determined number of internal clock cycles for controlling said speed of rotation.

7. A driver as defined in claim 6, further comprised of a master microprocessor for generating and transmitting digital address signals to said slave microprocessor for causing execution of said program loop to jump to a predetermined one of said branch instructions in response thereto.

8. A driver as defined in claim 6, wherein said speed of rotation varies from approximately 1800 rpm to 4000 rpm.

9. A driver as defined in claim 6, wherein said means for storing is further comprised of an extended look-up table for storing 180,6-bit additional digital signals preceding said 360 digital signals and arranged in three pairs corresponding to successive degrees of one half cycle of said waveform and a complement of said waveform, said inverter means being comprised of a three phase full-bridge inverter for connection to respective coils of said AC motor, and said pulse width modulated waveform being a twenty switch point Patel and Hoft waveform for eliminating five harmonics of said sine wave.

10. A driver as defined in claim 9, wherein said program loop includes a delay subprogram loop for execution by said microprocessor a predetermined number of times for increasing said predetermined number of clock cycles, and additional instructions for accessing high order nibbles of each of said digital signals from successive locations in said look-up table and low order nibbles of each of said additional digital signals from successive shifted locations of said extended table, wherein the amount of shift is proportional to the amount of voltage applied to said coils, said amount of shift being chosen to maintain constant volt-second operation of said motor at slow speeds.

11. A driver as defined in claim 10, further comprised of a master microprocessor for generating and transmitting digital signals to said slave microprocessor for causing execution of said delay subprogram loop said predetermined number of times, and controlling access of digital signals from said extended table in accordance with a predetermined amount of shift between said waveform and said complement of said waveform.

12. A driver as defined in claim 9, wherein said speed of rotation ranges from approximately 0 to 1800 rpm.

13. A driver as defined in claim 10 further including means for adjusting the amount of shift in response to varying load conditions.

14. A harmonically suppressed driver for use with an AC motor, comprised of:
 (a) a master microprocessor for generating control signals representative of the speed of rotation of said AC motor;
 (b) means for storing one cycle of a PWM waveform as a series of digital signals;
 (c) a slave microprocessor for receiving said control signals and responding thereto by changing the number of internal computer clock cycles required for each access of successive ones of said digital signals; and
 (d) means for applying said accessed digital signals to control inputs of one or more power switches of a full bridge inverter connected across respective coils of said AC motor, for actuating said switches according to a pre-determined sequence, whereby harmonically suppressed sinusoidal drive currents are generated in said coils in response to said switches being actuated according to said predetermined sequence.

15. A driver as defined in claim 14, wherein said PWM waveform is characterized by a Patel and Hoft waveform having a predetermined number of switching points.

16. A driver as defined in claim 15, wherein said slave microprocessor executes a program for accessing said successive digital signals, characterized by a predetermined number of clock cycles defining said predetermined rate of access.

17. A driver as defined in claim 16, wherein said program includes a plurality of sequential branch instructions, and said slave microprocessor executes predetermined ones of said branch instructions in accordance with said control signals, thereby defining said predetermined number of clock cycles.

18. A driver as defined in claim 15, wherein said slave microprocessor executes an additional program for phase shifting said PWM waveform and thereby altering said predetermined sequence of actuating the power switches, for controlling voltage applied to said coils in order to maintain constant volt-sec operation of said motor at slow speeds.

19. A driver as defined in claim 15, further including means for measuring speed of rotation of said motor, said master microprocessor being adapted to receive said measure of speed and modify said generated control signals, and said slave microprocessor being adapted to execute an additional program for phase shifting said PWM waveform in response to receiving said modified control signals, thereby altering said sequence of actuating the power switches for controlling the voltage applied to said coils to valves well above or well below the constant voltage-sec operation of said motor in response to varying load conditions.

* * * * *